US005577453A

United States Patent [19]
Lucht

[11] Patent Number: 5,577,453
[45] Date of Patent: Nov. 26, 1996

[54] ADJUSTABLE COMPACTING SKID FOR MECHANICAL TRANSPLANTER

[75] Inventor: Neal F. Lucht, Molalla, Oreg.

[73] Assignee: Northwest Transplants, Molalla, Oreg.

[21] Appl. No.: 488,744

[22] Filed: Jun. 8, 1995

[51] Int. Cl.$^6$ .................................................. A01C 11/02
[52] U.S. Cl. ............................................................. 111/109
[58] Field of Search ........................... 111/109, 100, 111/107, 197, 200, 101, 103, 104, 106

[56] References Cited

U.S. PATENT DOCUMENTS

| 239,764 | 4/1881 | Goldsmith | 111/109 |
|---|---|---|---|
| 511,814 | 1/1894 | Starks et al. | 111/109 X |
| 1,838,535 | 12/1931 | Dattisman | 111/109 |
| 2,475,078 | 7/1949 | Cherry | 111/109 |
| 4,344,374 | 8/1982 | Gangluff et al. | 111/109 |
| 4,355,588 | 10/1982 | Armstrong et al. | 111/109 |
| 4,404,917 | 9/1983 | Häkli | 111/109 |

FOREIGN PATENT DOCUMENTS

| 569803 | 11/1993 | European Pat. Off. | 111/100 |
|---|---|---|---|
| 1136667 | 5/1957 | France | 111/109 |

*Primary Examiner*—Terry Lee Melius
*Assistant Examiner*—Christopher J. Novosad
*Attorney, Agent, or Firm*—Baker & Daniels

[57] ABSTRACT

An adjustable compacting skid for mechanical seedling transplanters that compacts soil around transplanted seedlings to ensure proper moisture and nutrient delivery to the transplanted seedling. The compacting skid includes adjustable soil deflecting tabs that can be extended or retracted according to the present soil conditions as well as the type of seedling being transplanted.

18 Claims, 2 Drawing Sheets

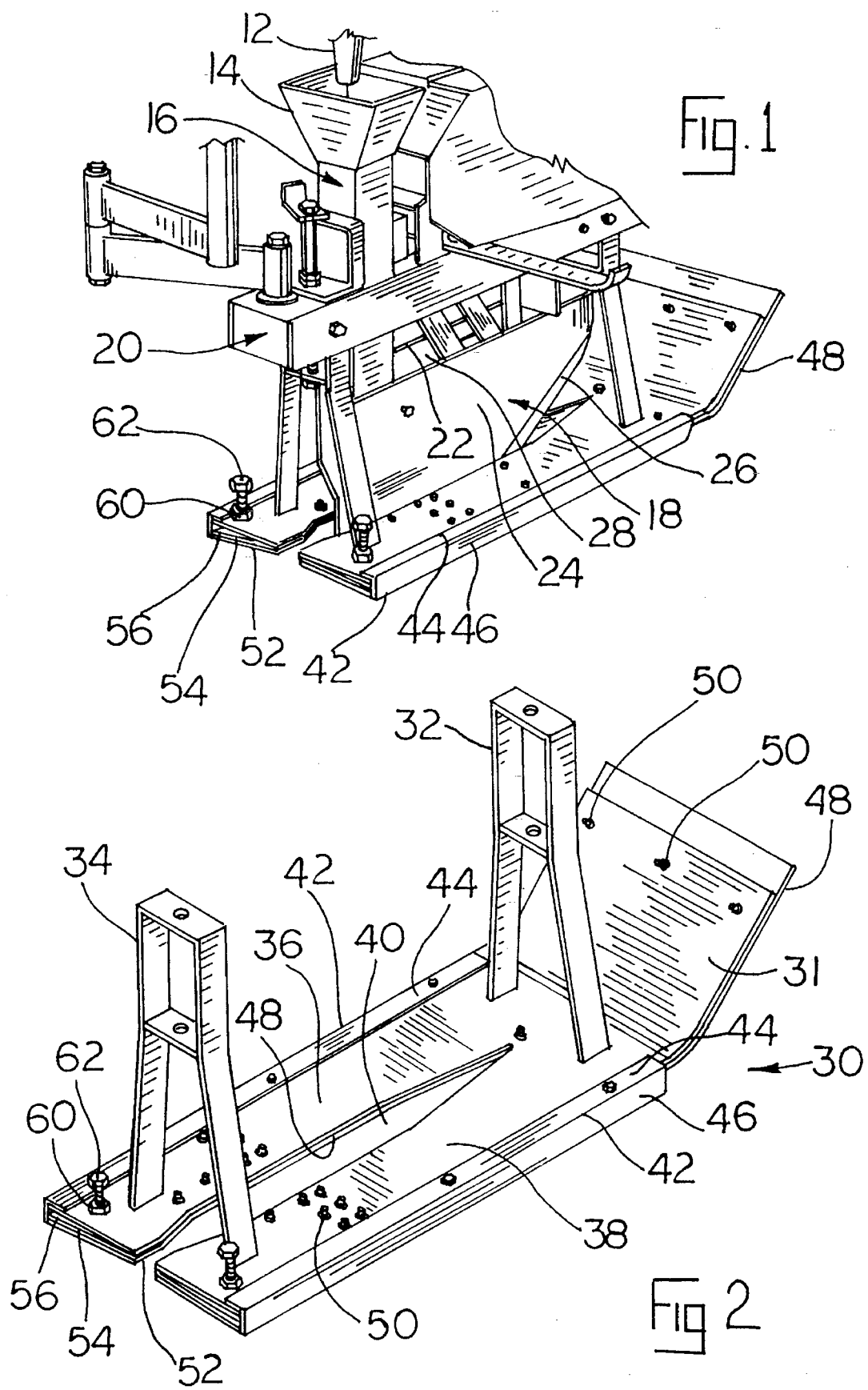

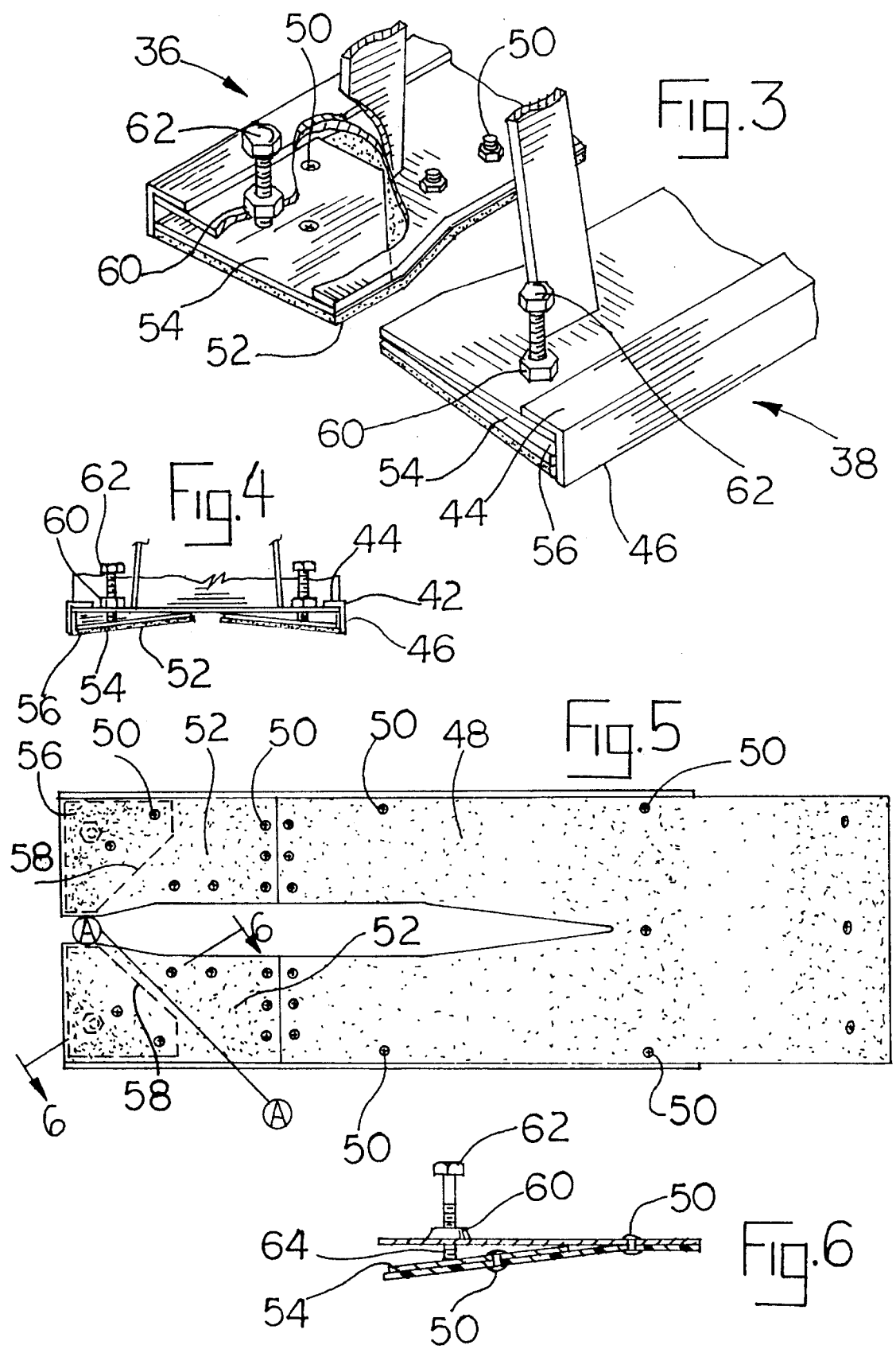

5,577,453

ADJUSTABLE COMPACTING SKID FOR MECHANICAL TRANSPLANTER

BACKGROUND OF THE INVENTION

The present invention relates generally to mechanical seedling transplanters. More specifically, the present invention relates to a novel and improved method of packing soil around transplanted seedlings.

In order to ensure the successful growth of a transplanted seedling, the soil around the transplanted seedling must be properly compacted so that enough moisture and nutrients can be delivered to the roots during the critical period immediately following transplantation. The optimal degree of compaction can vary greatly according to the soil type, the soil conditions, the speed of the transplanter, and the variety and hardiness of the seedling being planted.

The soil compaction methods of prior art transplanters were not adjustable, and therefore it is difficult to obtain proper compaction for different varieties of plants or for different soil conditions.

SUMMARY OF THE INVENTION

The present invention eliminates the problem of obtaining the proper soil compaction around transplanted seedlings because the present invention allows the operator to adjust the degree of compaction. As the soil type varies or as the amount of moisture in the soil changes, the operator can readily adjust the amount of compaction desired while the transplanter is operating.

The present invention also minimizes the diversion of soil from under the compacting skid, which compacts the soil around the transplanted seedling. Accordingly, the operator can obtain proper compaction while using a shorter and lighter compacting skid. The weight of a mechanical transplanter is an important consideration because multiple transplanter units are normally towed side by side. Therefore, the use of the present invention allows a reduction in weight, saves fuel, lowers lifting weight and towing weight, and allows the use of more units in combination.

Accordingly, it is an object of this invention to provide a mechanical transplanter that can be adjusted to vary the degree of soil compaction around a transplanted seedling.

It is another object of this invention to provide a mechanical transplanter that can be adjusted to suit varying soil types and conditions.

It is still another object of this invention to provide a mechanical transplanter that adjusts the degree of soil compaction in order to accommodate a variety of transplanted seedlings.

Other objects of the invention will become readily apparent to one skilled in the art upon a reading of the following description.

BRIEF DESCRIPTION OF THE DRAWINGS

FIG. 1 is a perspective view of a mechanical transplanter attached to an adjustable compacting skid made pursuant to the present invention;

FIG. 2 is a perspective view of the adjustable compacting skid shown in FIG. 1 and its support frame, but removed from the remainder of the transplanting unit;

FIG. 3 is a fragmentary perspective view, partly in section, of the rear-most portion of the adjustable compacting skid shown in FIGS. 1 and 2;

FIG. 4 is a rear elevational view of the adjustable compacting skid shown in FIGS. 2 and 3;

FIG. 5 is a bottom plan of the adjustable compacting skid illustrated in FIGS. 1–4;

FIG. 6 is a cross-sectional view taken substantially along lines 6—6 of FIG. 5.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to best enable others skilled in the art to follow its teachings.

Referring now to the drawings, a single row mechanical transplanter generally indicated by the numeral 10 is towed by a tractor or similar means of pulling (not shown). The single row transplanter 10 can be used in combination with similar units, such as in sets of four, six, or eight towed side by side. As shown in FIG. 1, the transplanter 10 includes a seedling cup 12 that drops a seedling (not shown) into seedling guide 14, which leads into seedling chute 16. The seedling passes through seedling chute 16 and is deposited into an open furrow in the ground created by soil opener 18. Soil opener 18 includes sides 22, 24 which are mounted to frame 20 in a spaced relationship and define a central cavity 28 therebetween for accommodating seedling delivery chute 16. The pair of sides 22, 24 converge to form a pointed leading edge 26 for urging soil outward to create a furrow in the ground.

Compacting skid 30 includes a pair of mounting brackets 32, 34 for mounting compacting skid 30 to frame 20, and further includes an upturned forward portion 31. Compacting skid 30 also includes a pair of trailing arms 36, 38. The pair of trailing arms 36, 38 define a central slot 40 therebetween for accommodating soil opener 18 and delivery chute 16. Each trailing arm 36, 38 includes a containment skeg 42 mounted thereto which extends along a portion of the overall length of compacting skid 30. Each containment skeg 42 includes a mounting portion 44 and a soil engaging portion 46 which extends into the ground. Flexible membrane 48 is attached to the bottom surface of compacting skid 30 by a plurality of fasteners 50. Flexible membrane 48 is constructed of rubber or other suitable material that is both flexible and durable. Flexible membrane 48 includes a rear portion 52, also attached by fasteners 50 to the rearmost portion of each trailing arm 36, 38. Deflecting plate 54 is fabricated from a rigid material and is disposed between rear portion 52 and trailing arms 36, 38 of compacting skid 30. Deflecting plate 54 is attached to rear portion 52 of membrane 48 by a plurality of fasteners 50. Deflecting plate 54 includes deflecting corner 56 and angled hinge surface 58.

Each trailing arm 36, 38 includes a threaded adjusting hole 60, which preferably consists of a threaded nut welded or otherwise affixed to the surface of the trailing arms in order to provide adequate thread contact area. Threaded adjusting bolt 62 is disposed in and extends through threaded adjusting hole 60 so that the tip 64 of threaded adjusting bolt 62 extends through compacting skid 30 and contacts deflecting plate 54. As threaded adjusting bolt 62 is threaded through threaded adjusting hole 60, tip 64 contacts deflecting plate 54 and urges the deflecting corner 56 away from the compacting skid 30 by bending the rear portion 52 of membrane 48 along reference line AA as shown in FIGS. 5 and 6, so that soil pressure maintains angled hinge portion 58 of deflecting plate 54 in contact with the bottom surface of compacting skid 30, while deflecting corner 56 is pushed away from the compacting skid to form an angled protrusion.

In operation, the mechanical transplanter is towed along a path by a tractor or similar means. The Soil opener 18 continuously opens a furrow in the ground, into which a seedling is deposited. The seedling is dropped from the seedling cup 12 into the seedling guide 14 and then into and through the seedling delivery chute 16 and the slot 40, from where the seedling is deposited into the open furrow at predetermined intervals. As the soil opener displaces soil to form a furrow, the displaced soil is contained under the compacting skid 30 by the containment skegs 42 which are attached to the trailing arms 36, 38. As the mechanical transplanter 10 continues to move along its path, the now stationary deposited seedling approaches the rear of the slot 40, at which point the deflecting corner 56 of the deflecting tabs 54 begin to urge soil back into the furrow, thereby compacting soil around the transplanted seedling. To adjust the degree of soil compaction, the adjusting bolt 62 is rotated in order to drive the tip 64 downward, which in turn forces the deflecting corner 56 of deflecting plate 54 downward, thereby urging more soil towards the open furrow and hence leading to more soil compaction around the deposited seedling.

It is understood that the above description does not limit the invention to the above-given details, but may be modified within the scope of the following claims.

I claim:

1. A mechanical transplanter device for transplanting seedlings comprising a frame for supporting said transplanter for movement along a path, furrow opening means mounted on said frame and engaging the ground for opening a furrow in the ground along said path, seedling delivery means mounted on said frame for delivering a seedling to said furrow, compacting means for closing said furrow after a seedling has been deposited therein by directing soil displaced from said opening by said furrow opening means back into said furrow and for compacting the soil around the transplanted seedling, said compacting means including a deflecting tab pivotably mounted for movement relative to the compacting means for deflecting soil downwardly and toward the seedling, and adjusting means for pivoting said tab to adjust the degree of soil compaction around the transplanted seedling, mounting means for mounting said compacting means on said frame below said delivery means, and containment means carried by the compacting means for containing soil displaced from said furrow by said furrow opening means under said compacting means so that displaced soil can be redirected into the furrow after deposition of the transplanted seedling.

2. A mechanical transplanter device as claimed in claim 1, wherein said compacting means includes a substantially flat skid plate, said skid plate including two arms, said arms defining a slot therebetween, said furrow opening means and said seedling delivery means extending into said slot, said seedling passing through said slot, said seedling delivery means, and into the furrow.

3. A mechanical transplanter device as claimed in claim 2, wherein said skid plate includes a front portion extending upwardly from the ground for keeping the front of said skid plate above the surface of the ground.

4. A mechanical transplanter device as claimed in claim 1, wherein said mounting means includes a support structure for connecting said compacting means to said frame, said support structure being attached to said frame and to the upper surface of said compacting means.

5. A mechanical transplanter device for transplanting seedlings comprising a frame for supporting said transplanter for movement along a path substantially coinciding with an open furrow, seedling delivery means mounted on said frame for delivering a seedling to said furrow, compacting means for closing said furrow after a seedling has been deposited therein by directing soil adjacent to said opening into said furrow and for compacting the soil thereby directed around the transplanted seedling, and mounting means for mounting said compacting means on said frame below said delivery means, said compacting means including filling means for filling said furrow so that soil adjacent to said opening can be pushed into the furrow after deposition of the transplanted seedling thereby closing the furrow, said filling means including a deflecting tab pivotably mounted for movement relative to the compacting means for deflecting soil downwardly and toward the seedling, and adjusting means for pivoting said tab to adjust the degree of soil compaction around the transplanted seedling.

6. A mechanical transplanter device as claimed in claim 5, wherein said compacting means includes a substantially flat skid plate, said skid plate including two arms, said arms defining a slot therebetween, said furrow opening means and said seedling delivery means extending into said slot, said seedling passing through said slot, said seedling delivery means, and into the furrow.

7. A mechanical transplanter device as claimed in claim 6, wherein said skid plate includes a front portion extending upwardly from the ground for keeping the front of said skid plate above the surface of the ground.

8. A mechanical transplanter device for transplanting seedlings comprising a frame for supporting said transplanter for movement along a path, furrow opening means mounted on said frame and engaging the ground for opening a furrow in the ground along said path, seedling delivery means mounted on said frame for delivering a seedling to said furrow, compacting means for closing said furrow after a seedling has been deposited therein by directing soil displaced from said opening by said furrow opening means back into said furrow and for compacting the soil around the transplanted seedling, said compacting means including adjusting means for adjusting the degree of soil compaction around the transplanted seedling, mounting means for mounting said compacting means on said frame below said delivery means, and containment means carried by the compacting means for containing soil displaced from said furrow by said furrow opening means under said compacting means so that displaced soil can be redirected into the furrow after deposition of the transplanted seedling, said compacting means including a substantially flat skid plate, said skid plate including two arms, said arms defining a slot therebetween, said furrow opening means and said seedling delivery means extending into said slot, said seedling passing through said slot, said seedling delivery means, and into the furrow, said containment means including a pair of skegs for maintaining at least a portion of the soil displaced from said furrow under said skid plate, said skegs being attached to said skid plate and extending substantially parallel to said path and projecting downwardly from the bottom surface of said skid plate into the ground.

9. A mechanical transplanter device for transplanting seedlings comprising a frame for supporting said transplanter for movement along a path, furrow opening means mounted on said frame and engaging the ground for opening a furrow in the ground along said path, seedling delivery means mounted on said frame for delivering a seedling to said furrow, compacting means for closing said furrow after a seedling has been deposited therein by directing soil displaced from said opening by said furrow opening means back into said furrow and for compacting the soil around the transplanted seedling, said compacting means including adjusting means for adjusting the degree of soil compaction around the transplanted seedling, mounting means for mounting said compacting means on said frame below said delivery means, and containment means carried by the compacting means for containing soil displaced from said furrow by said furrow opening means under said compacting means so that displaced soil can be redirected into the furrow after deposition of the transplanted seedling, said compacting means including a substantially flat skid plate, said skid plate including two arms, said arms defining a slot therebetween, said furrow opening means and said seedling delivery means extending into said slot, said seedling passing through said slot, said seedling delivery means, and into the furrow, said compacting means further including deflecting tabs for deflecting soil displaced from said furrow back into said furrow, said deflecting tabs attached to said skid plate.

10. A mechanical transplanter device as claimed in claim 9, wherein said skid plate includes hinge means for connecting said deflecting tabs to the skid plate, said deflecting tabs pivoting about said hinge means between a retracted position substantially coplanar with the skid plate and an extended position in which said deflecting tabs extend downwardly from said skid plate.

11. A mechanical transplanter device as claimed in claim 10, wherein said hinge means includes a flexible membrane attached to the bottom surface of said skid plate, said deflecting tabs being attached to said flexible membrane.

12. A mechanical transplanter device as claimed in claim 9, wherein said adjusting means includes an extension screw in threaded engagement with said skid plate and engaging said deflecting tabs to extend a corresponding deflecting tab from a retracted position to an extended position, said tabs in said extended position coacting with said skegs to direct soil inwardly from the skegs and downwardly into the open furrow thereby closing the furrow around the deposited seedling.

13. A mechanical transplanter device for transplanting seedlings comprising a frame for supporting said transplanter for movement along a path substantially coinciding with an open furrow, seedling delivery means mounted on said frame for delivering a seedling to said furrow, compacting means for closing said furrow after a seedling has been deposited therein by directing soil adjacent to said opening into said furrow and for compacting the soil thereby directed around the transplanted seedling, and mounting means for mounting said compacting means on said frame below said delivery means, said compacting means including filling means for filling said furrow so that soil adjacent to said opening can be pushed into the furrow after deposition of the transplanted seedling thereby closing the furrow, said filling means including adjusting means for adjusting the degree of soil compaction around the transplanted seedling, said compacting means including a substantially flat skid plate, said skid plate including two arms, said arms defining a slot therebetween, said furrow opening means and said seedling delivery means extending into said slot, said seedling passing through said slot, said seedling delivery means, and into the furrow, said containment means including said filling means further including deflecting tabs for deflecting soil displaced from said furrow back into said furrow, said deflecting tabs attached to said skid plate.

14. A mechanical transplanter device as claimed in claim 13, wherein said skid plate includes hinge means for connecting said deflecting tabs to the skid plate, said deflecting tabs pivoting about said hinge means between a retracted position substantially coplanar with the skid plate and an extended position in which said deflecting tabs extend downwardly from said skid plate.

15. A mechanical transplanter device as claimed in claim 14, wherein said hinge means includes a flexible membrane attached to the bottom surface of said skid plate, said deflecting tabs being attached to said flexible membrane.

16. A mechanical transplanter device for transplanting seedlings comprising a frame for supporting said transplanter for movement along a path, furrow opening means mounted on said frame and engaging the ground for opening a furrow in the ground along said path, seedling delivery means mounted on said frame for delivering a seedling to said furrow, compacting means for closing said furrow after a seedling has been deposited therein by directing soil displaced from said opening by said furrow opening means back into said furrow and for compacting the soil around the transplanted seedling, said compacting means including adjusting means for adjusting the degree of soil compaction around the transplanted seedling, mounting means for mounting said compacting means on said frame below said delivery means, and containment means carried by the compacting means and having a portion extending alongside said furrow opening means but offset therefrom in a direction transverse to said path for containing soil displaced from said furrow by said furrow opening means under said compacting means so that displaced soil can be redirected into the furrow after deposition of the transplanted seedling.

17. A mechanical transplanter device as claimed in claim 16, wherein said compacting means includes a substantially flat skid plate, said skid plate including two arms, said arms defining a slot therebetween, said furrow opening means and said seedling delivery means extending into said slot, said seedling passing through said slot, said seedling delivery means, and into the furrow.

18. A mechanical transplanter device as claimed in claim 17, wherein said skid plate includes a front portion extending upwardly from the ground for keeping the front of said skid plate above the surface of the ground.

* * * * *